United States Patent Office 3,761,424
Patented Sept. 25, 1973

3,761,424
CATALYSTS FOR THE OXIDATION OF ALKENES
Edgar Koberstein, Alzenau, Theodor Lussling, Grossauheim, Ewald Noll, Grosskrotzenburg, Helmut Suchsland, Grossauheim, and Wolfgang Weigert, Offenbach, Germany, assignors to Deutsche Gold- und Silber-Scheideanstalt vormals Roessler, Frankfurt, Germany
No Drawing. Continuation-in-part of application Ser. No. 852,932, Aug. 25, 1969, now Patent No. 3,639,269. This application Oct. 8, 1971, Ser. No. 187,875
Claims priority, application Germany, Aug. 31, 1968, P 17 92 424.2; Oct. 9, 1970, P 20 49 583.4
The portion of the term of the patent subsequent to Feb. 1, 1989, has been disclaimed
Int. Cl. B01j 11/82
U.S. Cl. 252—437   11 Claims

ABSTRACT OF THE DISCLOSURE

A catalyst for the oxidation of alkenes to unsaturated aldehydes and carboxylic acids containing Ni, Co, Fe, Bi, P, Mo and O is improved by adding tantalum oxide or samarium oxide and employing as a carrier a mixture of lattice layer silicate and highly dispersed silica.

---

The present invention is a continuation-in-part of application 852,932 filed Aug. 25, 1969, now Pat. 3,639,269. The entire disclosure of the parent application is hereby incorporated by reference.

The invention is concerned with a catalyst for the production of unsaturated aldehydes and carboxylic acids by the oxidation in the gas phase. It is especially concerned with such a catalyst having high mechanical strength.

It is known according to the present application (and corresponding German Offenlegungsschrift 1,792,424) to oxidize alkenes to unsaturated aldehydes and carboxylic acids using a catalyst consisting of at least one of Ni and Co, Fe, Bi, P, Mo and O together with tantalum oxide or samarium oxide and in a given case with a carrier, advantageously with a lattice layer silicate, such as montmorillonite, depending upon the type of use in granular form, e.g. for fluidized beds or in the form of tablets, e.g. for use in solid (packed) beds.

As stated in parent application 852,932, the catalyst can have the empirical formula $$Ni_a Co_b Fe_c Bi_d P_e Mo_f O_g$$

where (a) is a number from 0 to 20, (b) is a number from 0 to 15, (a) and (b) together are a number from 2 to 20, (c) is a number from 0.1 to 7, (d) is a number from 0.1 to 4, (e) is a number from 0.1 to 2, (f) is a number of about 12 and (g) is a number of 35 to 85, together with the samarium oxide or tantalum oxide. As the additive, there is advantageously employed 0.2 to 5.0%, preferably 0.5 to 2.0% of $Sm_2O_3$ or $Ta_2O_5$ based on the total catalyst.

There can be employed any of the catalysts set forth in Belgium Pat. 670,510 or corresponding U.S. Pat. 3,454,630 including, for example, the following:

$Ni_{10.5}Fe_1Bi_1P_1Mo_{12}O_{57}$ $Ni_{10}Co_{0.3}Fe_1Bi_1P_{0.2}Mo_{12}O_{53}$ $Ni_{10}Co_{0.3}Fe_1Bi_1P_1Mo_{12}O_{57}$ $Ni_{10}Co_{0.3}Fe_1Bi_1P_{0.5}Mo_{12}O_{56}$ $Ni_{4.5}Co_4Fe_1Bi_1P_1Mo_{12}O_{54}$ $Ni_7Co_{0.5}Fe_2Bi_2P_1Mo_{12}O_{54}$ $Ni_7Co_2Fe_1Bi_1P_1Mo_{12}O_{54}$ $Ni_{10.5}Fe_1Bi_1P_{0.5}Mo_{12}O_{56}$ $Ni_{10.5}Fe_1Bi_{1.5}Mo_{12}O_{58}$ $Ni_{7.5}Fe_2Bi_2P_1Mo_{12}O_{55}$ $Ni_{4.5}Fe_3Bi_3P_{0.8}Mo_{12}O_{53}$ $Ni_{12}Fe_{1.3}Bi_{0.7}P_1Mo_{12}O_{58}$ $Ni_{14}Fe_1Bi_1P_1Mo_{12}O_{60}$ $Ni_{10.5}Fe_{0.5}Bi_{1.5}P_1Mo_{12}O_{57}$ $Co_6Fe_1Bi_1P_1Mo_{12}O_{50}$ $Co_{4.5}Fe_{1.5}Bi_{1.5}P_1Mo_{12}O_{49}$ $Ni_{10}Fe_{0.5}Bi_{1.5}P_1Mo_{12}O_{57}$ $Ni_{10}Co_{0.3}Fe_1Bi_1P_{0.5}Mo_{12}O_{54}$ $Ni_{4.5}Co_4Fe_1Bi_1P_1Mo_{12}O_{52}$ $Ni_7Co_2Fe_1Bi_1P_1Mo_{12}O_{53}$ $Ni_{10}Co_{0.3}Fe_1Bi_1P_1Mo_{12}O_{51}$

The entire disclosure of Belgium Pat. 670,510 is hereby incorporated by reference.

The preferred catalyst has the formula $$Ni_{10}Co_{0.3}Fe_1Bi_1P_1Mo_{12}O_{57}$$

Such a catalyst including, however, samarium oxide or tantalum oxide is characterized primarily by a higher selectivity than the same catalyst omitting the samarium oxide or tantalum oxide. Under the same process conditions, there are obtained higher conversion and at the same amount of conversion higher yields of unsaturated aldehydes and carboxylic acids. Especially the amount of combustion products such as carbon monoxide and carbon dioxide is appreciably less.

The catalysts as stated in the parent case are used in a suitable manner on carriers such as silicas or other materials used for this purpose, e.g. alumina, silicon carbide, activated carbon, etc.

The catalyst mass is prepared so that the finished mass exhibits a surface area of 1 to 20, especially 2 to 10 m.²/g. Such a catalyst mass has a surprisingly high lifetime and besides is easily producible in always the same quality and with the same properties.

The oxidation of the alkenes to the corresponding aldehydes and carboxylic acids using the catalysts of the invention takes place in the usual manner with oxygen in the presence of water in vapor phase. There is a broad latitude in the choice of reaction conditions. The reaction is chiefly carried out without the use of pressure at temperatures between 320 and 420° C. As indicated in the Belgian Pat. 670,510, these conditions can be varied, e.g. temperatures of 250 to 450° C. and pressures of 0.5 to 10 atmospheres absolute can be employed. The oxygen for the oxidation can originate from any source. In general air is employed since it is readily available. The molar range in proportions of alkene to air to water can be in a wide region. As molar proportions of alkene to air there can be used from 1:5 to 1:20, preferably 1:8 to 1:12, as molar proportions of alkene to water 1:1 to 1:25, preferably 1:2 to 1:6. Advantageously there is employed a residence time of 0.5 to 10, preferably 1 to 4, seconds. These conditions as stated can be varied as shown for example in the Belgian Pat. and are not critical.

Using the catalysts of the invention alkenes with more than 2, preferably 3 or 4 carbon atoms can be reacted. Thus, there can be used propylene, isobutylene, butene-1, butene-2, amylene, hexene-1, etc. As unsaturated aldehydes and acids, there can be formed acrolein, acrylic acid, methacrolein, methacrylic acid, crotonaldehyde, crotonic acid, etc.

Unless otherwise indicated, all parts and percentages are by weight.

In the following examples, the following terms are used:

$$\text{Conversion} = \frac{\text{moles of converted alkene}}{\text{moles of alkene added}} \times 100 \text{ (percent)}$$

$$\text{Yield} = \frac{\text{moles of unsaturated compounds produced}}{\text{moles of alkene added}} \times 100 \text{ (percent)}$$

$$\text{Selectivity} = \frac{\text{moles of unsaturated compounds produced}}{\text{moles of alkene transformed}} \times 100 \text{ (percent)}$$

Residence time $$= \frac{\text{bulk volume of the catalyst}}{\text{gas volume through put time}} \text{ (seconds)}$$

Space-time-yield $$= \frac{\text{mass of unsaturated compounds produced/time}}{\text{bulk volume of the catalyst}} \left(\frac{g}{l. \times h.}\right)$$

$$\text{Loss} = \frac{\text{moles combustion products (CO and CO}_2\text{)}}{\text{moles of alkene added}} \times 100 \text{ (percent)}$$

EXAMPLE 1

Finely divided loose stratified montmorillonite was heated for 5 hours at 1000° C. 110 grams thereof was treated in succession with stirring with the following solutions:

(A) an aqueous solution of 218.1 grams $$Ni(NO_3)_2 \cdot 6H_2O$$

6.5 grams of $Co(NO_3)_2 \cdot 6H_2O$ and 30.3 grams of $$Fe(NO_3)_3 \cdot 9H_2O$$

in 145.0 grams of water.

(B) A nitric acid solution containing 2.22 grams of $Sm_2O_3$, 14.0 grams $HNO_3$ and 10.0 grams water.

(C) An aqueous solution of 158.5 grams of $$(NH_4)_6Mo_7O_{24} \cdot 4H_2O$$

and 8.64 grams of 85% phosphoric acid and 500.0 grams of water.

(D) A nitric acid solution of 36.4 grams $$Bi(NO_3)_3 \cdot 5H_2O$$

3.6 grams $HNO_3$ and 27.0 grams of water.

The resulting suspension was brought to dryness at 110° C. and heated for 2 hours at 250° C. The product was cooled, ground and formed into pellets having a diameter of 2 mm. and a length of 10 mm. Finally, it was calcined at 550° C. for 4 hours.

The catalyst produced had the empirical formula $$Ni_{10}Co_{0.3}Fe_1Bi_1P_1Mo_{12}O_{57}$$

and also contained 1% $Sm_2O_3$. The catalyst mass consisted of 67% of catalyst and 33% of the silicate carrier. It had a surface area (BET) of 3.8 m.²/g.

37 grams of this catalyst mass was poured into a reactor which was heated to 360° C. Then there was continuously introduced a mixture of propylene, air and steam in the molar proportions of 1:10:4.1. The residence time amounted to 1.8 seconds. The reaction gases were cooled and analyzed. The catalyst was unchanged in surface area and activity after 40 hours of service.

Conversion _____ percent__ 90.0
Yield of acrolein _____ do____ 74.4
Yield of acrylic acid _____ do____ 9.3
Loss (CO and CO₂) _____ do____ 0.6
Selectivity (acrolein and acrylic acid) _____ do____ 93.1
Space-time-yield (acrolein and acrylic acid)
    g./l. x h__ 121

EXAMPLE 2

The process was carried out as in Example 1 but using 1% $Ta_2O_5$ in place of 1% $Sm_2O_3$.

For this purpose in the catalyst preparation as solution B there was used a solution of 2.47 grams of $HTaO_4 \cdot H_2O$ in 300.0 grams of 30% aqueous hydrogen peroxide solution. The catalyst prepared had a surface area of 6.5 m.²/g.

Conversion _____ percent__ 93.8
Yield of acrolein _____ do____ 65.2
Yield of acrylic acid _____ do____ 16.5
Loss (CO and CO₂) _____ do____ 7.8
Selectivity (acrolein and acrylic acid) _____ do____ 87.2
Space-time-yield (acrolein and acrylic acid)
    g./l. x h__ 121

EXAMPLE 3

There was used a catalyst mass produced in accordance with Example 1. Its surface area was 5.6 m.²/g. In place of propylene isobutylene was used.

44 grams of catalyst mass were added. The isobutylene-air-steam mixture had the molar proportions of 1:18:22. The residence time amounted to 4 seconds.

Conversion _____ percent__ 79.9
Yield of methacrolein _____ do____ 37.9
Yield of methacrylic acid _____ do____ 35.0
Loss (CO and CO₂) _____ do____ 1.0
Selectivity (methacrolein and methacrylic acid)
    do____ 91.2
Space-time-yield (methacrolein and methacrylic acid) _____ g./l. x h__ 109

EXAMPLE 4

There was used the same catalyst as in Example 1. It was added, however, not as a solid bed but as a fluidized bed. For this purpose from the catalyst mass pretreated by heating to 250° C. the fraction between 0.1 and 0.4 mm. was removed by sieving. The granules removed by sieving were calcined at 550° C. for 4 hours and used as such as the catalyst. It had a surface area of 4.4 m.²/g.

53 grams of the catalyst were introduced into the reactor as a fluidized bed, the reactor was heated to 360° C. and then there was introduced a propylene-air-steam mixture in the molar proportions of 1:18:10. The residence time amounted to 1.5 seconds.

Conversion _____ percent__ 85.4
Yield of acrolein _____ do____ 58.3
Yield of acrylic acid _____ do____ 16.3
Loss (CO and CO₂) _____ do____ 9.6
Selectivity (acrolein and acrylic acid) _____ do____ 87.3
Space-time-yield (acrolein and acrylic acid)
    g./l. x h__ 89

EXAMPLE 5

The procedure of Example 4 was followed, however, for comparison using a catalyst without $Sm_2O_3$. For this purpose in the preparation of the catalyst solution B was omitted.

Conversion _____ percent__ 77.4
Yield of acrolein _____ do____ 48.8
Yield of acrylic acid _____ do____ 11.8
Loss (CO and CO₂) _____ do____ 15.4
Selectivity (acrolein and acrylic acid) _____ do____ 78.3
Space-time-yield (acrolein and acrylic acid)
    g./l. x h__ 72

The present invention uses the same catalysts as those in the parent application, however, it employs as the carrier a mixture consisting of lattice layer silicate and highly dispersed silica.

Surprisingly this type of catalyst having highly dispersed silicon dioxide (silica) added to the lattice layer silicate has a high mechanical strength, especially in the form of tablets, (although it can also be used in granular form) and thereby advantageously differs from corresponding catalysts not containing the addition of highly dispersed silica. The increased mechanical strength means reduced abrasion and a longer life for the catalyst.

The catalyst corresponds to the formula $$Ni_aCo_bFe_cBi_dP_eMo_fO_g$$

when (a), (b), (c), (d), (e), (f) and (g) are as defined above. Any of the catalysts mentioned supra coming within the formula can be used. As stated, the catalyst also contains samarium or tantalum, advantageously in an amount of 0.2 to 5.0%, preferably 0.5 to 2.0% calculated as $Sm_2O_3$ or $Ta_2O_5$ respectively.

The thus composed catalyst according to the invention is mixed with about 10 to 60 weight percent, preferably about 20 to 40 weight percent of the carrier consisting of lattice layer silicate and highly dispersed silica. The proportions of lattice layer silicate to highly dispersed silica in parts by weight range from 20:1 to 0.25:1, preferably 10:1 to 1:1, especially 5:1 to 1:1. The elements nickel, cobalt, iron, bismuth, phosphorus, molybdenum and samarium or tantalum are present in the catalyst generally as oxides or as compounds with each other and oxygen.

As lattice layer silicate there can be employed for example montmorillonite, talc, pyrophillite, kaolinite.

To produce the catalysts of the invention there are brought together starting materials containing the corresponding elements together with the lattice layer silicate and the highly dispersed silica, and this mixture is treated, in a given case after shaping, at a temperature between 550 and 750° C. in the presence of oxygen.

A pretreatment can be employed generally with naturally occurring lattice layer silicates used in the invention. They are finely pulverized and, preferably under constant motion, for example in a rotary kiln or fluidized bed furnace, heated to a temperature between 900 and 1200° C. The heating time is adjusted according to the type of lattice layer silicate, the temperature and type of furnace. In most cases the material is held for at least one hour but not more than 10 hours at temperatures in the named region. Preferably as the lattice layer silicate there is used montmorillonite and for this there is preferably used a treatment time of 4 to 6 hours at 975 to 1050° C.

As highly dispersed silica there is preferably used pyrogenic silica having a surface area (BET) of at least 150 m²./g., e.g. 200 m²./g., 350 m²./g. and up to 800 m²./g. Examples of such highly dispersed silicas are Aerosil, Cabosil, Hi-Sil and the like.

The elements nickel, cobalt, iron, bismuth, phosphorus and molybdenum can be added as the oxides. They can also be added as the elements themselves or as any compounds which can be converted to oxides with oxygen, as for example the nitrates, e.g. see Examples 1, 6 and 8.

First there is prepared a thorough mixture of the starting materials. For this purpose the materials can be directly mixed as solids. However, it has proven advantageous to add water, in a given case to introduce one or more of the materials to be mixed as an aqueous solution or as a paste in water and to there evaporate this aqueous mixture to dryness to recover the catalyst.

The catalyst thus prepared by the mixing of starting materials, in a given case with the addition of water, is heated to a temperature between 550 and 750° C. and at this temperature is treated with oxygen. The procedure to use in the heating as well as the temperature and time of treatment are adjusted according to the type of starting material, according to their proportions and according to the procedure chosen for preparation of the mixture. The exact method of treatment is not critical but can be varied as will be recognized by those skilled in the art.

The materials can be directly heated to the treatment temperature. However it can be advantageous, especially if water is used in producing the mixture, to first only moderately heat the materials and to slowly increase the temperature, in a given case in the course of several hours, e.g. 3 hours, uniformly or preferably stepwise to the temperature of treatment of 550 to 750° C. For this purpose for example first a temperature in the range of 200 to 300° C. is employed and held for at least 10 minutes, in a given case up to several hours, e.g. 3 hours. It is suitable that the material is in contact with oxygen during the heating and is held in constant movement. The heating takes place thence advantageously in a rotary kiln or fluidized bed furnace.

For the final treatment with oxygen the materials are heated to a temperature between 550 and 750° C., preferably to 600 to 700° C. The treatment at these temperatures generally lasts at least 10 minutes, if necessary up to 10 hours, for the most part 15 to 60 minutes. Instead of oxygen there can be used air or other oxygen containing gaseous mixtures, so long as they are effective to oxidize the catalyst material and are inert except for their oxygen content.

In the treatment with oxygen, in those cases where there are not used oxides or other compounds with oxygen as starting materials, there are formed in the catalyst material the corresponding oxygen containing compounds of nickel, cobalt, iron, bismuth, phosphorus and molybdenum. The conversion in these compounds, however, can previously have taken place partially or completely or can have taken place during the preparation of the mixture. The finished catalyst material generally has a surface area (BET) of 1 to 20 m²./g., usually at least 2 m²./g.

A preferred procedure is to thoroughly mix a montmorillonite pretreated at 975 to 1050° C. and the highly dispersed silica (e.g. Aerosil, a pyrogenic silica) with aqueous, as the case may be, nitric acid solutions produced from nitrates or oxides of the elements nickel, cobalt, iron and samarium, as well as with an aqueous phosphoric acid solution of ammonium molybdate, wherein the sequence in which these materials are brought together can be selected as desired. To this mixture is finally added an aqueous nitric acid solution of bismuth nitrate. In a given case tantalum added in place of samarium is used as a solution of tantalic acid in aqueous hydrogen peroxide. The catalyst mixture thus prepared, expediently with the use of drum or spray driers, is freed of water, subsequently heated for 20 minutes to 2 hours in the presence of oxygen at about 250° C. and then is further heated to 650 to 680° C. for 15 to 30 minutes.

The catalyst is especially suited for use in packed beds in the forms of tablets. Preferably these are employed measuring 4 to 6 mm. in diameter and 4 to 6 mm. high. For the preparation of the tablets it is advantageous to start from materials which have already been heated for some time at a temperature between 200 and 300° C. in the presence of oxygen. It can also be advantageous to add to this material tabletting acids. For example graphite is suitable as such. Generally there is added 1 to 10 weight percent, especially 2 to 5 weight percent of graphite based on the total composition. The shaping takes place for example on conventional tabletting devices. After the shaping the catalyst material, as previously described, is treated with oxygen at temperatures between 550 and 750° C.

The oxidation of the alkenes to the corresponding aldehydes and carboxylic acids using the catalysts of the invention takes place in the usual manner with oxygen in the presence of water in the vapor phase. As set forth above a wide range in the choice of reaction conditions can be employed. The reaction is chiefly carried out without the use of pressure at temperatures between 320 and 420° C. The oxygen for the oxidation can originate from any source. In general air is employed (since it is readily available). The molar range in proportions of alkene to air to water can vary in a wide range. As molar proportions of alkene to air there can be used from 1:5 to 1:20, preferably 1:8 to 1:12, as molar proportions of alkene to water 1:1 to 1:25, preferably 1:2 to 1:6. Advantageously there is employed a residence time of 0.2 to 10, preferably 1 to 4 seconds. These conditions are not critical and can be varied for example as set forth in the cited Belgian patent.

The catalysts of the invention can be used with any of the alkenes set forth supra containing more than 2 carbon atoms and preferably containing 3 to 4 carbon atoms. The unsaturated aldehydes and acids formed, for example, can be any of those set forth supra.

In the following examples the follows terms are used.

$$\text{Conversion} = \frac{\text{moles of converted alkene}}{\text{moles of alkene added}} \times 100 \text{(percent)}$$

$$\text{Yield} = \frac{\text{moles of product produced}}{\text{moles of alkene added}} \times 100 \text{ (percent)}$$

$$\text{Feed} = \frac{\text{moles of alkene added/time}}{\text{bulk volume of the catalyst}} \left( \frac{\text{moles}}{\text{l. x h.}} \right)$$

Space-time-yield $$= \frac{\text{mass of product produced/time}}{\text{bulk volume of catalyst}} \left( \frac{\text{g.}}{\text{l. x h.}} \right)$$

EXAMPLE 6

Finely divided loose stratified montmorillonite was heated for 5 hours at 1000° C. 110 grams of this material were treated in succession with stirring with the following solutions.

(A) An aqueous solution of 218.1 grams of $$Ni(NO_3)_2 \cdot 6H_2O,$$

6.5 grams of $Co(NO_3)_2 \cdot 6H_2O$ and 30.3 grams of $Fe(NO_3)_3 \cdot 9H_2O$ in 145.0 grams of water.

(B) A nitric acid solution containing 2.22 grams of $Sm_2O_3$, 140 grams of $HNO_3$ and 10.0 grams of water.

(C) An aqueous solution of 158.5 grams of $$(NH_4)_6Mo_7O_{24} \cdot 4H_2O),$$

8.64 grams of 85% phosphoric acid and 500.0 grams of water.

(D) A nitric acid solution of 36.4 grams of $Bi(NO_3)_3 \cdot 5H_2O$, 3.6 grams of $HNO_3$ and 27.0 grams of water.

The resulting suspension was brought to dryness on a drum drier. The dried material while under constant movement was heated with the introduction of air for 2 hours at 250° C. The product was cooled, ground and formed into pellets having a diameter of 5 mm. and a height of 5 mm. The tablets were heated to 650° C. for 20 minutes with the introduction of air. They had a strength of 3.5 kp. under radial pressure. The catalyst tablets produced had the empirical composition:

$$Ni_{10}Co_{0.3}Fe_1Bi_1P_1Mo_{12}O_{57}$$

and also contained 1 weight percent of $Sm_2O_3$. The catalyst tablets consisted of 67% of this catalyst and 33% of the silicate carrier. It had a surface area (BET) of 3.8 m.$^2$/g.

A portion of these catalyst tablets with a bulk volume of 50 ml. were poured in a stainless steel reactor 200 mm. long and having a 20 mm. inner diameter. The reactor was heated to 360° C. by means of a salt bath. There was added a mixture of propylene, air and steam in the molar proportions of 1:10:2.

Feed of propylene _____moles/l. x h__ 2.44
Conversion of propylene _____percent__ 90
Yield of acrolein _____do____ 72
Yield of acrylic acid _____do____ 9
Space-time-yield of acrolein and acrylic acid
  g./l. x h__ 114

EXAMPLE 7

The procedure was the same as in Example 6 except that in place of the 110 grams of montmorillonite there was employed a mixture of 82.5 grams of the pretreated montmorillonite and 27.5 grams of silica having a surface area of 200 m.$^2$/g. The catalyst tablets had a strength of 9 kp. under radical pressure. The surface area was 13 m.$^2$/g. The conversion of propylene was carried out in the same reactor and under the same conditions as described in Example 1.

Feed of propylene _____moles/l. x h__ 2.44
Conversion of propylene _____percent__ 92
Yield of acrolein _____do____ 75
Yield of acrylic acid _____do____ 8
Space - time - yield of acrolein and acrylic acid _____g./l. x h__ 117

EXAMPLE 8

With stirring there were brought together
(A) An aqueous solution of 2908 grams of $$Ni(NO_3)_2 \cdot 6H_2O$$

87.3 grams of $Co(NO_3)_2 \cdot 6H_2O$ and 404 grams of $Fe(NO_3)_3 \cdot 9H_2O$ in 1940 grams of water.

(B) A nitric acid solution containing 29.6 grams of $Sm_2O_3$, 186 grams of concentrated $HNO_3$ and 133 grams of water.

(C) 968 grams of finely divided montmorillonite which had been pretreated for 5 hours at 1020° C., in admixture with 520 grams of silica having a surface area of 200 m.$^2$/g.

(D) An aqueous solution of 2118 grams of $$(NH_4)_6Mo_7O_{24} \cdot 4H_2O$$

and 115.4 grams of 85% phosphoric acid and 6700 grams of water.

(E) A nitric acid solution of 485 grams of $$Bi(NO_3)_3 \cdot 5H_2O$$

in 48 grams of concentrated $HNO_3$ and 360 grams of water.

The working up of the mixture of materials and the preparation of tablets was carried out as in Example 6. The tablets had a strength of 11.3 kp. under radial pressure. The surface area was 13 m.$^2$/g.

Tablets having a bulk volume of 1.45 liters were poured into a reactor having a length of 3100 mm. and an inner diameter of 25 mm. The reactor was heated to 320° C. by means of a salt bath. There was added a mixture of propylene, air and steam in the molar proportions of 1:8:2.

Feed of propylene _____moles/l. x h__ 5.38
Conversion of propylene _____percent__ 89
Yield of acrolein _____do____ 70
Yield of acrylic acid _____do____ 11
Space - time - yield of acrolein and acrylic acid _____g./l. x h__ 253

What is claimed is:
1. A catalyst composition suitable for the oxidation of alkenes to unsaturated aldehydes and carboxylic acids consisting of (1) $Ni_aCo_bFe_cBi_dP_eMo_fO_g$ where (a) is a number from 0 to 20, (b) is a number from 0 to 15, (a) and (b) together are a number from 2 to 20, (c) is a number from 0.1 to 7, (d) is a number from 0.1 to 4, (e) is a number from 0.1 to 2, (f) is a number of about

12 and (g) is a number of 35 to 85, together with (2) 0.2 and 5% of tantalum or samarium calculated as $Sm_2O_3Ta_2O_5$ together with a carrier which is a mixture of a lattice layer silicate and a highly dispersed silica having a surface area of at least 150 m.²/g., the ratio of lattice layer silicate to highly dispersed silica being from 20:1 to 0.25:1 and the carrier being 10 to 60% of the total of carrier and catalyst.

2. A catalyst composition according to claim 1 wherein the lattice layer silicate is selected from the group consisting of montmorillonite, talc, pyrophillite and kaolinite.

3. A catalyst composition according to claim 1 wherein the amount of samarium or tantalum is 0.5 to 2.0% calculated as $Sm_2O_3$ or $Ta_2O_5$.

4. A catalyst composition according to claim 1 wherein the ratio of lattice layer silicate to highly dispersed silica is from 10:1 to 1:1.

5. A catalyst composition according to claim 4 wherein the ratio of lattice layer silicate to highly dispersed silica is from 5:1 to 1:1.

6. A catalyst composition according to claim 4 wherein the lattice layer silicate is montmorillonite.

7. A catalyst composition according to claim 1 wherein the catalyst has a surface area of 1 to 20 m.²/g.

8. A process of producing the catalyst composition of claim 1 comprising preparing a mixture of the elements nickel, cobalt, iron, bismuth, phosphorus and molybdenum together with samarium or tantalum, said elements being present in the form of the elements per se or compounds thereof, together with the lattice layer silicate and highly dispersed silica and heating this mixture with oxygen at a temperature of 550 to 750° C.

9. A process according to claim 8 wherein the heating is at 600 to 700° C.

10. A process according to claim 8 wherein the mixture is prepared with the addition of liquid water.

11. A process according to claim 8 wherein the mixture is slowly heated to the temperature of 550 to 750° C.

References Cited

UNITED STATES PATENTS

| | | | |
|---|---|---|---|
| 3,639,269 | 2/1972 | Koberstein et al. | 252—437 |
| 3,454,630 | 7/1969 | Yamaguchi et al. | 252—437 X |
| 3,471,556 | 10/1969 | Yamaguchi et al. | 252—437 X |
| 3,522,299 | 7/1970 | Takenaka et al. | 252—437 X |
| 3,271,447 | 9/1966 | Naylor | 252—437 X |
| 3,338,952 | 8/1967 | Callahan et al. | 260—604 R |

PATRICK P. GARVIN, Primary Examiner

U.S. Cl. X.R.

252—435; 260—533 N, 604 R